(12) United States Patent
Jung et al.

(10) Patent No.: US 9,243,119 B2
(45) Date of Patent: Jan. 26, 2016

(54) POLYIMIDE FILM

(75) Inventors: Hak Gee Jung, Yongin-si (KR); Hyo Jun Park, Yongin-si (KR); Sang Min Song, Yongin-si (KR); Chung Seock Kang, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 760 days.

(21) Appl. No.: 12/675,643

(22) PCT Filed: Aug. 27, 2008

(86) PCT No.: PCT/KR2008/005007
§ 371 (c)(1),
(2), (4) Date: May 5, 2010

(87) PCT Pub. No.: WO2009/028862
PCT Pub. Date: Mar. 5, 2009

(65) Prior Publication Data
US 2010/0255221 A1    Oct. 7, 2010

(30) Foreign Application Priority Data

Aug. 27, 2007 (KR) .................. 10-2007-0086224

(51) Int. Cl.
*C09K 19/00* (2006.01)
*C08J 5/18* (2006.01)

(52) U.S. Cl.
CPC ............... *C08J 5/18* (2013.01); *C08J 2379/08* (2013.01); *Y10T 428/1023* (2015.01)

(58) Field of Classification Search
CPC ............... G02F 1/133723; C08G 73/1039; C08G 73/1042; C08L 79/08; B29D 7/01; B29D 11/00788; C08J 5/18; C08J 2379/08; Y10T 428/1005; Y10T 428/1023
USPC ............... 428/1.2, 1.26, 220, 473.5; 528/170, 528/183, 184, 322, 353
See application file for complete search history.

(56) References Cited

U.S. PATENT DOCUMENTS

| | | | | |
|---|---|---|---|---|
| 4,876,330 A | * | 10/1989 | Higashi et al. | 528/353 |
| 4,912,197 A | * | 3/1990 | Hayes | 528/353 |
| 2006/0063016 A1 | * | 3/2006 | Ko et al. | 428/458 |

* cited by examiner

*Primary Examiner* — Ruiyun Zhang
(74) *Attorney, Agent, or Firm* — Sughrue Mion, PLLC

(57) ABSTRACT

Disclosed is a polyimide film, which is colorless and transparent, with superior mechanical properties and high thermal stability.

12 Claims, 2 Drawing Sheets

POLYIMIDE FILM

CROSS REFERENCE TO RELATED APPLICATIONS

This application is a National Stage of International Application No. PCT/KR2008/005007 filed Aug. 27, 2008, claiming priority based on Korean Patent Application No. 10-2007-0086224 filed Aug. 27, 2007 the contents of all of which are incorporated herein by reference in their entirety.

TECHNICAL FIELD

The present invention relates to a polyimide film which is colorless and transparent.

BACKGROUND ART

Generally, a polyimide (PI) film is a film of polyimide resin. Polyimide resin is a highly heat-resistant resin obtained by subjecting aromatic dianhydride and aromatic diamine or aromatic diisocyanate to solution polymerization to prepare a polyamic acid derivative, which is then subjected to ring closure and dehydration at high temperatures to imidize it.

Polyimide resin, which is insoluble, infusible and resistant to very high heat, has superior properties regarding such as thermal oxidation resistance, heat resistance, radiation resistance, low-temperature resistance, and chemical resistance, and is thus used in various fields of application, including advanced heat resistant materials such as automobile materials, aircraft materials, or spacecraft materials, and electronic materials such as insulation coating agents, insulating films, semiconductors, or electrode protective films of TFT-LCDs. Recently, polyimide resin is also used for display materials, such as optical fibers or liquid crystal alignment layers, and transparent electrode films, in which conductive filler is contained in the film or is applied onto the surface of the film.

However, polyimide resin is disadvantageous because it has a high aromatic ring density, and thus is colored brown or yellow, undesirably resulting in low transmittance in the visible light range. Polyimide resin suffers because light transmittance is decreased attributable to the yellow-like color thereof, thus making it difficult to apply the polyimide resin to fields requiring transparency.

In order to solve such problems, attempts to realize methods of purifying monomers and a solvent to high purities in order to achieve polymerization have been made, but the improvement in transmittance was not large.

U.S. Pat. No. 5,053,480 discloses a method of preparing a polyimide resin using an alicyclic dianhydride component instead of the aromatic dianhydride. According to this method, when the polyimide resin is in a solution phase or a film phase, transparency and color are improved, compared to the results of the purifying methods. However, limitations are imposed on improving transmittance, and thereby high transmittance is not realized, and further, the thermal and mechanical properties are deteriorated.

In U.S. Pat. Nos. 4,595,548, 4,603,061, 4,645,824, 4,895,972, 5,218,083, 5,093,453, 5,218,077, 5,367,046, 5,338,826, 5,986,036, and 6,232,428, and Korean Unexamined Patent Publication No. 2003-0009437, there have been reports related to the preparation of a novel polyimide, which is improved in terms of transmittance and color transparency within a range inside which thermal properties are not greatly decreased, using aromatic dianhydride and aromatic diamine monomers, having a linker, such as —O—, —$SO_2$—, or —$CH_2$—, a bent structure due to connection not at the p-position but at the m-position, or a substituent, such as —$CF_3$. However, the polyimide thus prepared is evaluated to have mechanical properties, yellowing index, and visible light transmittance which are inadequate for use in semiconductor insulating films, TFT-LCD insulating films, electrode protective films, and flexible display substrates.

Moreover, in the case where the polyimide resin is colorless and transparent but has a high coefficient of linear thermal expansion (CTE), the degree of expansion and contraction of the polyimide film depending on the changes in temperature in the TFT process is increased, undesirably causing damage to an inorganic film used in devices and deteriorating the capability of devices. Therefore, with the goal of using the polyimide resin as substrates for TFTs, substrates for color filters, and alignment layers, the polyimide resin must have a low CTE while being colorless and transparent.

DISCLOSURE

Technical Problem

Accordingly, the present invention provides a polyimide film, which is colorless and transparent and has a low CTE.

In addition, the present invention provides a polyimide film which is colorless and transparent and has superior mechanical properties and high thermal stability.

Technical Solution

According to a preferred embodiment of the present invention, a polyimide film may be manufactured from a copolymer of aromatic dianhydride and aromatic diamine, and may have an average CTE of 35.0 ppm/° C. or less, when measured at 50~250° C. for a film thickness of 50~100 μm according to a TMA method, with a yellowing index of 15 or less.

The polyimide film according to the embodiment may have average transmittance of 85% or more at 380~780 nm, when measured using a UV spectrophotometer for the film thickness of 50~100 μm.

The polyimide film according to the embodiment may have transmittance of 88% or more at 550 nm and a transmittance of 70% or more at 440 nm, when measured using a UV spectrophotometer for the film thickness of 50~100 μm.

The polyimide film according to the embodiment may have a 50% cut-off wavelength of 400 nm or less, when measured using a UV spectrophotometer.

The polyimide film according to the embodiment may have color coordinates in which L is 90 or more, a is 5 or less and b is 5 or less, when measured using a UV spectrophotometer for the film thickness of 50~100 μm.

In the embodiment, the polyimide film may be obtained by polymerizing the diamine and the dianhydride in presence of a first solvent, thus obtaining a polyamic acid solution, imidizing the polyamic acid solution, adding the imidized solution to a second solvent, performing filtration and drying, thus obtaining a solid polyimide resin, dissolving the solid polyimide resin in the first solvent, thus preparing a polyimide solution, which is then subjected to a film forming process.

As such, the second solvent may have polarity lower than that of the first solvent.

In the embodiment, the first solvent may comprise one or more selected from among m-cresol, N-methyl-2-pyrrolidone (NMP), dimethylformamide (DMF), dimethylacetamide (DMAc), dimethylsulfoxide (DMSO), acetone, diethylacetate; a low boiling point solvent; and a low absorbing solvent, and the second solvent may comprise one or more selected from among water, alcohols, ethers, and ketones.

In the polyimide film according to the embodiment, the aromatic dianhydride may comprise one or more selected from among 2,2-bis(3,4-dicarboxyphenyl)hexafluoropropane dianhydride (FDA), 4-(2,5-dioxotetrahydrofuran-3-yl)-1,2,3,4-tetrahydronaphthalene-1,2-dicarboxylic anhydride (TDA), and 4,4'-(4,4'-isopropylidenediphenoxy)bis(phthalic anhydride) (HBDA), and one or more selected from among pyromellitic dianhydride (PMDA), biphenyltetracarboxylic dianhydride (BPDA), and oxydiphthalic dianhydride (ODPA).

In the polyimide film according to the embodiment, the aromatic diamine may comprise one or more selected from among 2,2-bis[4-(4-aminophenoxy)-phenyl]propane (6HMDA), 2,2'-bis(trifluoromethyl)-4,4'-diaminobiphenyl (2,2'-TFDB), 3,3'-bis(trifluoromethyl)-4,4'-diaminobiphenyl (3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4(4-aminophenoxy)phenyl]hexafluoropropane (4-BDAF), 2,2'-bis(3-aminophenyl)hexafluoropropane (3,3'-6F), 2,2'-bis(4-aminophenyl)hexafluoropropane (4,4'-6F) and oxydianiline (ODA).

According to another preferred embodiment of the present invention, a substrate for a display may comprise the above polyimide film.

According to a further preferred embodiment of the present invention, an alignment layer may comprise the above polyimide film.

According to still a further preferred embodiment of the present invention, a protective film may comprise the above polyimide film.

Advantageous Effects

According to the present invention, the polyimide film is colorless and transparent and has a low CTE, and can thus be used for LCDs. In addition, the polyimide film is colorless and transparent and exhibits superior mechanical properties and high thermal stability and is thus suitable for use in various fields including semiconductor insulating films, TFT-LCD insulating films, passivation films, liquid crystal alignment layers, optical communication materials, protective films for solar cells, and flexible display substrates.

BEST MODE

Figure 1:
FIG. 1 is a photograph of the polyimide film of Example 1 having a thickness of 100 μm and placed on a piece of paper.

Hereinafter, a detailed description will be given of the present invention.

A polyimide film according to the present invention is a film of polyimide resin prepared from a copolymer of a diamine component and a dianhydride component, and in particular, is a colorless transparent polyimide film.

Further, the polyimide film according to the present invention is suitable for use in a substrate for a TFT, a substrate for a color filter, or an alignment layer, which is provided on the backlight unit of an LCD.

The process for forming a TFT on a substrate is typically performed in the wide temperature range of 130~600° C. In order to actually realize desired performance, the process for forming a TFT (a-Si TFT, poly-Si TFT) is performed at about 250° C. using an inorganic material. So, in the case where such a substrate has a high CTE, it expands in proportion to the magnitude of the CTE in the high-temperature TFT process and then contracts during cooling to room temperature. In this case, if the degree of expansion and contraction of the substrate is greatly different from that of the inorganic material for the TFT, damage to the inorganic film occurs and the capability of the TFT device is deteriorated. Hence, the CTE of the substrate must be as low as possible. In consideration thereof, the polyimide film of the present invention preferably has an average CTE of 35.0 ppm/° C. or less, when measured at 50~250° C. for a film thickness of 50~100 μm according to a TMA method.

Further, the polyimide film of the present invention has a yellowing index of 15 or less, and also, the polyimide film of the present invention has average transmittance of 85% or more at 380~780 nm, when measured using a UV spectrophotometer for the film thickness of 50~100 μm. Further, the polyimide film has transmittance of 88% or more at 550 nm and 70% or more at 440 nm, when measured using a UV spectrophotometer for the film thickness of 50~100 μm.

Furthermore, the polyimide film of the present invention has color coordinates, in which L is 90 or more, a is 5 or less and b is 5 or less, when measured using a UV spectrophotometer for the film thickness of 50~100 μm.

The polyimide film, satisfying the aforementioned transmittance and color coordinates, may be used in fields requiring transparency, in which the use of conventional polyimide films is limited attributable to the yellow color thereof, including protective films, or diffusion sheets and coating films of TFT-LCDs, for example, interlayers, gate insulators, and liquid crystal alignment layers of TFT-LCDs. When said transparent polyimide is applied to a liquid crystal alignment layer, it contributes to an increase in porosity, thus enabling the fabrication of a TFT-LCD having a high contrast ratio. As well, the polyimide may be used for flexible display substrates.

The polyimide film of the present invention has a 50% cut-off wavelength of 400 nm or less, when measured using a UV spectrophotometer, and is therefore suitable for use in a protective film for protecting the surface of a solar cell.

Therefore, the aromatic dianhydride component used in the present invention includes one or more selected from among 2,2-bis(3,4-dicarboxyphenyl)hexafluoropropane dianhydride (FDA), 4-(2,5-dioxotetrahydrofuran-3-yl)-1,2,3,4-tetrahydronaphthalene-1,2-dicarboxylic anhydride (TDA), and 4,4'-(4,4'-isopropylidenediphenoxy)bis(phthalic anhydride) (HBDA), and preferably further includes one or more selected from among pyromellitic dianhydride (PMDA), biphenyltetracarboxylic dianhydride (BPDA), and oxydiphthalic dianhydride (ODPA).

The aromatic diamine component used in the present invention is not particularly limited but includes one or more selected from among 2,2-bis[4-(4-aminophenoxy)-phenyl] propane (6HMDA), 2,2'-bis(trifluoromethyl)-4,4"-diaminobiphenyl (2,2'-TFDB), 3,3'-bis(trifluoromethyl)-4,4'-diaminobiphenyl (3,3'-TFDB), 4,4'-bis(3-aminophenoxy) diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy) benzene (APB-134), 2,2'-bis[3(3-aminophenoxy)phenyl] hexafluoropropane (3-BDAF), 2,2'-bis[4(4-aminophenoxy) phenyl]hexafluoropropane (4-BDAF), 2,2'-bis(3-aminophenyl)hexafluoropropane (3,3'-6F), 2,2'-bis(4-aminophenyl)hexafluoropropane (4,4'-6F) and oxydianiline (ODA).

The dianhydride component and the diamine component are dissolved in equivalent molar amounts in an organic solvent and are then reacted, thus preparing a polyamic acid solution.

The reaction conditions are not particularly limited, but include a reaction temperature of −20~80° C. and a reaction time of 2~48 hours. Further, the reaction is preferably conducted in an inert atmosphere of argon or nitrogen.

A first solvent for the solution polymerization of the monomers is not particularly limited, as long as polyamic acid can be dissolved therein. As known reaction solvents, useful are one or more polar solvents selected from among m-cresol, N-methyl-2-pyrrolidone (NMP), dimethylformamide (DMF), dimethylacetamide (DMAc), dimethylsulfoxide (DMSO), acetone, and diethylacetate. In addition, a low boiling point solvent, such as tetrahydrofuran (THF) or chloroform, or a low absorbing solvent, such as γ-butyrolactone, may be used.

The amount of the first solvent is not particularly limited, but is preferably 50~95 wt %, and more preferably 70~90 wt %, based on the total amount of the polyamic acid solution, in order to realize appropriate molecular weight and viscosity of the polyamic acid solution.

Further, when the polyimide film is manufactured using the polyamic acid solution, a filler may be added to the polyamic acid solution so as to improve various properties of the polyimide film, including sliding properties, heat conductivity, electrical conductivity, and corona resistance. The filler is not particularly limited, but specific examples thereof include silica, titanium oxide, layered silica, carbon nanotubes, alumina, silicon nitride, boron nitride, calcium hydrogen phosphate, calcium phosphate, and mica.

The particle size of the filler may vary depending on the properties of the film to be modified and the type of filler to be added, and is not particularly limited. The average particle size thereof is preferably set within 0.00~150 μm, more preferably 0.005~25 μm, and still more preferably 0.01~10 μm. Such sizes facilitate the effective modification of the polyimide film and may result in good surface properties, electrical conductivity, and mechanical properties of the polyimide film.

The amount of the filler may vary depending on the properties of the film to be modified and the particle size of the filler, and is not particularly limited. The filler is added in an amount of 0.001~20 parts by weight, and preferably 0.01~10 parts by weight, per 100 parts by weight of the polyamic acid solution.

The method of adding the filler is not particularly limited, but includes, for instance, adding the filler to the polyamic acid solution before or after polymerization, kneading the filler using a 3 roll mill after completion of the polymerization of polyamic acid, or mixing a dispersion solution containing the filler with the polyamic acid solution.

The method of manufacturing the polyimide film from the polyamic acid solution thus obtained is not particularly limited, and any known method, including casting of a polyamic acid solution on a support and then performing imidization, may be used.

As such, the imidization of the polyamic acid solution includes, for example, thermal imidization, chemical imidization, and a combination of thermal imidization and chemical imidization. Chemical imidization is conducted by adding a dehydrating agent, including acid anhydride, such as acetic anhydride, and an imidization catalyst, including tertiary amine, such as isoquinoline, β-picoline, or pyridine, to the polyamic acid solution. In the case where thermal imidization or a combination of thermal imidization and chemical imidization is conducted, heating conditions of the polyamic acid solution may vary depending on the type of polyamic acid solution and the thickness of the resulting polyimide film.

When specifically describing the manufacture of the polyimide film using a combination of thermal imidization and chemical imidization, the polyimide film may be obtained by adding a dehydrating agent and an imidization catalyst to a polyamic acid solution, casting the polyamic acid solution on a support, performing heating at 80~200° C. and preferably 100~180° C. to activate the dehydrating agent and the imidization catalyst, performing partial curing and drying to obtain a polyamic acid film in a gel state, separating the gel film from the support, and heating the gel film at 200~400° C. for 5~400 sec.

Alternatively, in the present invention, a polyimide film may be manufactured through the following procedures using the polyamic acid solution. Specifically, the polyimide film may be obtained by imidizing the polyamic acid solution, adding the imidized solution to a second solvent, performing filtration and drying, thus obtaining a solid polyimide resin, dissolving the solid polyimide resin in the first solvent, thus preparing a polyimide solution, which is then subjected to a film forming process.

When the polyamic acid solution is imidized, thermal imidization, chemical imidization, and a combination of thermal imidization and chemical imidization may be applied as mentioned above. In the case of using a combination of thermal imidization and chemical imidization, imidization may be specifically executed by subjecting the polyamic acid solution to addition of a dehydrating agent and an imidization catalyst and then to heating at 20~180° C. for 1~12 hours.

The first solvent may be the same as the solvent used for the polymerization of the polyamic acid solution. In order to obtain the solid polyimide resin, as the second solvent, any solvent may be used so long as it has polarity lower than that of the first solvent, with the consideration of the principle that the polyamic acid polymer is precipitated into a solid due to the difference in solubility using a solvent that is unable to dissolve the polyamic acid polymer. Particularly useful are one or more selected from among water, alcohols, ethers, and ketones.

The amount of the second solvent is not particularly limited, and is preferably 5~20 times the weight of the polyamic acid solution.

The conditions for drying the filtered solid polyimide resin include a temperature of 50~150° C. and a time period of 2~24 hours, taking into consideration the boiling point of the second solvent and the boiling point of the first solvent which may remain in the solid resin.

In the film forming process, the polyimide solution, in which the solid polyimide resin is dissolved, is cast on the support, and is then heated for a period of time ranging from 1 min to 8 hours while the temperature is gradually increased at an incremental rate of 1~10° C./min in the range of 40~400° C., yielding the polyimide film.

The thickness of the polyimide film thus obtained is not particularly limited, but is preferably 10250 μm, and more preferably 25~250 μm.

MODE FOR INVENTION

A better understanding of the present invention may be obtained through the following examples, which are set forth to illustrate, but are not to be construed as the limit of the present invention.

Example 1

While nitrogen was passed through a 100 mL three-neck round bottom flask reactor equipped with a stirrer, a nitrogen inlet, a dropping funnel, a temperature controller and a condenser, 31.82 g of N,N-dimethylacetamide (DMAc) was placed in the reactor, the temperature of the reactor was decreased to 0° C., 3.2023 g (0.01 mol) of 2,2'-TFDB was dissolved therein, and then this solution was maintained at 0° C. Further, 4.164 g (0.008 mol) of 6HBDA was added thereto and stirred for 1 hour, thus completely dissolving the 6HBDA, after which 0.58844 g (0.002 mol) of BPDA was added thereto, thus completely dissolving the BPDA. The solid content was thus 20 wt %. The solution was then stirred at room temperature for 8 hours, thus obtaining a polyamic acid solution having a viscosity of 1900 cps at 23° C.

Thereafter, the polyamic acid solution thus obtained was added with 2~4 equivalents of each of acetic anhydride (acetic oxide, available from SamChun) and pyridine (available from SamChun), and was then heated at a heating rate of 1~10° C./min within a temperature range from 20° C. to 180° C. for 2~10 hours, thereby imidizing the polyamic acid solution. 30 g of the imidized solution was added to 300 g of water, after which the precipitated solid was filtered and milled, thus obtaining powder, which was then dried in a vacuum oven at 80~100° C. for 2~6 hours, giving about 8 g of solid resin powder. The solid resin thus obtained was dissolved in 32 g of DMAc or DMF serving as a polymerization solvent, thus obtaining a 20 wt % polyimide solution. The polyimide solution was heated at a heating rate of 1~10° C./min within a temperature range from 40° C. to 400° C. for 2~8 hours, resulting in polyimide films having a thickness of 50 μm and 100 μm.

Example 2

As in Example 1, 3.2023 g (0.01 mol) of 2,2'-TFDB was dissolved in 33.59 g of DMAc, and this solution was maintained at 0° C. 3.64355 g (0.007 mol) of 6HBDA and 1.551 g (0.003 mol) of ODPA were sequentially added thereto, and then stirred for 1 hour, thus completely dissolving the 6HBDA and ODPA. The solid content was thus 20 wt %. The solution was then stirred at room temperature for 8 hours, thus obtaining a polyamic acid solution having a viscosity of 1800 cps at 23° C.

Thereafter, polyimide films were manufactured in the same manner as in Example 1.

Example 3

As in Example 1, 3.2023 g (0.01 mol) of 2,2'-TFDB was dissolved in 29.50 g of DMAc, and this solution was maintained at 0° C. 3.554 g (0.008 mol) of 6FDA and 0.6204 g (0.002 mol) of ODPA were sequentially added thereto, and then stirred for 1 hour, thus completely dissolving the 6FDA and ODPA. The solid content was thus 20 wt %. The solution was then stirred at room temperature for 8 hours, thus obtaining a polyamic acid solution having a viscosity of 1700 cps at 23° C.

Thereafter, polyimide films were manufactured in the same manner as in Example 1.

Example 4

As in Example 1, 3.2023 g (0.01 mol) of 2,2'-TFDB was dissolved in 27.90 g of DMAc, and this solution was maintained at 0° C. 2.22125 g (0.005 mol) of 6FDA and 1.551 g (0.005 mol) of ODPA were sequentially added thereto, and then stirred for 1 hour, thus completely dissolving the 6FDA and ODPA. The solid content was thus 20 wt %. The solution was then stirred at room temperature for 8 hours, thus obtaining a polyamic acid solution having a viscosity of 1800 cps at 23° C.

Thereafter, polyimide films were manufactured in the same manner as in Example 1.

Example 5

As in Example 1, 3.2023 g (0.01 mol) of 2,2'-TFDB was dissolved in 27.362 g of DMAc, and this solution was maintained at 0° C. 1.777 g (0.004 mol) of 6FDA and 1.8612 g (0.006 mol) of ODPA were sequentially added thereto, and then stirred for 1 hour, thus completely dissolving the 6FDA and ODPA. The solid content was thus 20 wt %. The solution was then stirred at room temperature for 8 hours, thus obtaining a polyamic acid solution having a viscosity of 1800 cps at 23° C.

Thereafter, polyimide films were manufactured in the same manner as in Example 1.

Example 6

As in Example 1, 3.2023 g (0.01 mol) of 2,2'-TFDB was dissolved in 29.38 g of DMAc, and this solution was maintained at 0° C. 3.554 g (0.008 mol) of 6FDA and 0.58844 g (0.002 mol) of BPDA were sequentially added thereto, and then stirred for 1 hour, thus completely dissolving the 6FDA and BPDA. The solid content was thus 20 wt %. The solution was then stirred at room temperature for 8 hours, thus obtaining a polyamic acid solution having a viscosity of 2000 cps at 23° C.

Thereafter, polyimide films were manufactured in the same manner as in Example 1.

Example 7

As in Example 1, 3.2023 g (0.01 mol) of 2,2'-TFDB was dissolved in 28.78 g of DMAc, and this solution was maintained at 0° C. 3.10975 g (0.007 mol) of 6FDA and 0.88266 g (0.003 mol) of BPDA were sequentially added thereto, and then stirred for 1 hour, thus completely dissolving the 6FDA and BPDA. The solid content was thus 20 wt %. The solution was then stirred at room temperature for 8 hours, thus obtaining a polyamic acid solution having a viscosity of 2100 cps at 23° C.

Thereafter, polyimide films were manufactured in the same manner as in Example 1.

Example 8

As in Example 1, 3.2023 g (0.01 mol) of 2,2'-TFDB was dissolved in 28.77 g of DMAc, and this solution was maintained at 0° C. 3.554 g (0.008 mol) of 6FDA and 0.43624 g (0.002 mol) of PMDA were sequentially added thereto, and then stirred for 1 hour, thus completely dissolving the 6FDA and PMDA. The solid content was thus 20 wt %. The solution was then stirred at room temperature for 8 hours, thus obtaining a polyamic acid solution having a viscosity of 1800 cps at 23° C.

Thereafter, polyimide films were manufactured in the same manner as in Example 1.

Example 9

As in Example 1, 1.60115 g (0.005 mol) of 2,2'-TFDB was dissolved in 28.18 g of DMAc, 1.6713 g (0.005 mol) of 4,4'-6F was dissolved therein, and then this solution was maintained at 0° C. 2.22125 g (0.005 mol) of 6FDA and 1.551 g (0.005 mol) of ODPA were sequentially added thereto, and then stirred for 1 hour, thus completely dissolving the 6FDA and ODPA. The solid content was thus 20 wt %. The solution was then stirred at room temperature for 8 hours, thus obtaining a polyamic acid solution having a viscosity of 1800 cps at 23° C.

Thereafter, polyimide films were manufactured in the same manner as in Example 1.

Example 10

As in Example 1, 1.9213 g (0.006 mol) of 2,2'-TFDB was dissolved in 25.98 g of DMAc, 0.80096 g (0.004 mol) of 4,4'-ODA was dissolved therein, and then this solution was maintained at 0° C. 2.22125 g (0.005 mol) of 6FDA and 1.551 g (0.005 mol) of ODPA were sequentially added thereto, and then stirred for 1 hour, thus completely dissolving the 6FDA and ODPA. The solid content was thus 20 wt %. The solution was then stirred at room temperature for 8 hours, thus obtaining a polyamic acid solution having a viscosity of 2000 cps at 23° C.

Thereafter, polyimide films were manufactured in the same manner as in Example 1.

Example 11

As in Example 1, 2.24161 g (0.007 mol) of 2,2'-TFDB was dissolved in 27.92 g of DMAc, 0.7449 g (0.003 mol) of 3-DDS was dissolved therein, and then this solution was maintained at 0° C. 3.10975 g (0.007 mol) of 6FDA and 0.88266 g (0.003 mol) of BPDA were sequentially added thereto, and then stirred for 1 hour, thus completely dissolving the 6FDA and BPDA. The solid content was thus 20 wt %. The solution was then stirred at room temperature for 8 hours, thus obtaining a polyamic acid solution having a viscosity of 1700 cps at 23° C.

Thereafter, polyimide films were manufactured in the same manner as in Example 1.

Example 12

A polyamic acid solution having the same composition as in Example 3 was prepared, after which the polyamic acid solution thus obtained was spread to a thickness of 500~1000 μm on a glass substrate using a doctor blade, and was then dried in a vacuum oven at 40° C. for 1 hour and at 60° C. for 2 hours, thus obtaining a self-supporting film, which was then heated in a high-temperature oven at 80° C. for 3 hours, 100° C. for 1 hour, 200° C. for 1 hour, and 300° C. for 30 min at a heating rate of 5° C./min, thereby affording polyimide films having a thickness of 50 μm and 100 μm.

Example 13

A polyamic acid solution having the same composition as in Example 6 was prepared, after which the polyamic acid solution thus obtained was spread to a thickness of 500~1000 μm on a glass substrate using a doctor blade, and was then dried in a vacuum oven at 40° C. for 1 hour and at 60° C. for 2 hours, thus obtaining a self-supporting film, which was then heated in a high-temperature oven at 80° C. for 3 hours, 100° C. for 1 hour, 200° C. for 1 hour, and 300° C. for 30 min at a heating rate of 5° C./min, thereby affording polyimide films having a thickness of 50 μm and 100 μm.

Example 14

A polyamic acid solution having the same composition as in Example 8 was prepared, after which the polyamic acid solution thus obtained was spread to a thickness of 500~1000 μm on a glass substrate using a doctor blade, and was then dried in a vacuum oven at 40° C. for 1 hour and at 60° C. for 2 hours, thus obtaining a self-supporting film, which was then heated in a high-temperature oven at 80° C. for 3 hours, 100° C. for 1 hour, 200° C. for 1 hour, and 300° C. for 30 min at a heating rate of 5° C./min, thereby affording polyimide films having a thickness of 50 μm and 100 μm.

Comparative Example 1

As in Example 1, 5.1846 g (0.01 mol) of 4-BDAF was dissolved in 38.5084 g of DMAc, after which 4.4425 g (0.01 mol) of 6FDA was added thereto and stirred for 1 hour, thus completely dissolving the 6FDA. The solid content was thus 20 wt %. The solution was then stirred at room temperature for 8 hours, thus obtaining a polyamic acid solution having a viscosity of 1300 cps at 23° C.

Thereafter, the polyamic acid solution obtained after the completion of the reaction was spread to a thickness of 500~1000 μm on a glass substrate using a doctor blade, and was then dried in a vacuum oven at 40° C. for 1 hour and at 60° C. for 2 hours, thus obtaining a self-supporting film, which was then heated in a high-temperature oven at 80° C. for 3 hours, 100° C. for 1 hour, 200° C. for 1 hour, and 300° C. for 30 min at a heating rate of 5° C./min, thereby affording polyimide films having a thickness of 25 μm, 50 μm, and 100 μm.

Comparative Example 2

As in Example 1, 2.9233 g (0.01 mol) of APB-133 was dissolved in 29.4632 g of DMAc, and 4.4425 g (0.01 mol) of 6FDA was added thereto and stirred for 1 hour, thus completely dissolving the 6-FDA. The solid content was thus 20 wt %. The solution was then stirred at room temperature for 8 hours, thus obtaining a polyamic acid solution having a viscosity of 1200 cps at 23° C.

Thereafter, polyimide films were manufactured in the same manner as in Comparative Example 1.

Comparative Example 3

As in Example 1, 2.0024 g (0.01 mol) of 3,3'-ODA was dissolved in 25.7796 g of DMAc, after which 4.4425 g (0.01 mol) of 6FDA was added thereto and stirred for 1 hour, thus completely dissolving the 6FDA. The solid content was 20 wt %. The solution was then stirred at room temperature for 8 hours, thus obtaining a polyamic acid solution having a viscosity of 1600 cps at 23° C.

Thereafter, polyimide films were manufactured in the same manner as in Comparative Example 1.

Comparative Example 4

As in Example 1, 2.0024 g (0.01 mol) of 4,4'-ODA was dissolved in 16.7344 g of DMAc, and 2.1812 g (0.01 mol) of PMDA was added thereto and stirred for 1 hour, thus completely dissolving the PMDA. The solid content was thus 20 wt %. The solution was then stirred at room temperature for 8 hours, thus obtaining a polyamic acid solution having a viscosity of 2500 poise at 23° C.

Thereafter, polyimide films were manufactured in the same manner as in Comparative Example 1.

The properties of the polyimide films manufactured in the examples and comparative examples were measured as follows. The results are summarized in Tables 1 and 2 below.

(1) Coefficient of Linear Thermal Expansion (CTE)

The CTE of the polyimide film was measured at 50~200° C. according to a TMA method using a TMA (Q400, available from TA Instrument). The measurement conditions were as follows.

Size of Test Specimen: 20 mm×4 mm

Temperature: heating to 50~250° C., heating rate of 10° C./min

Load: 10 g (weight of pendulum hanging from the test specimen)

(2) Yellowing Index

The yellowing index of the polyimide film was measured using a UV spectrophotometer (Cary 100, available from Varian) according to ASTM E313.

(3) Transmittance and 50% Cut-Off Wavelength

The visible light transmittance and 50% cut-off wavelength of the polyimide film were measured using a UV spectrophotometer (Cary100, available from Varian).

Figure 2:
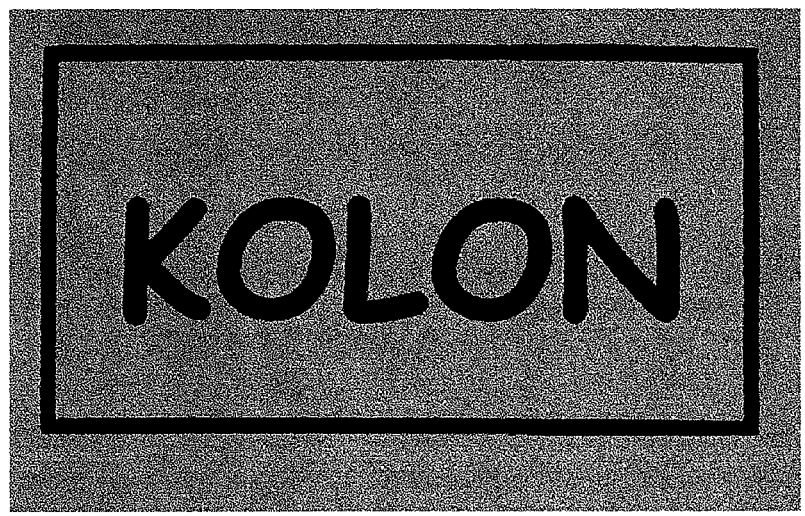
FIG. 2 is a photograph of the polyimide film of Comparative Example 1 having a thickness of 25 μm and placed on a piece of paper.
Figure 3:
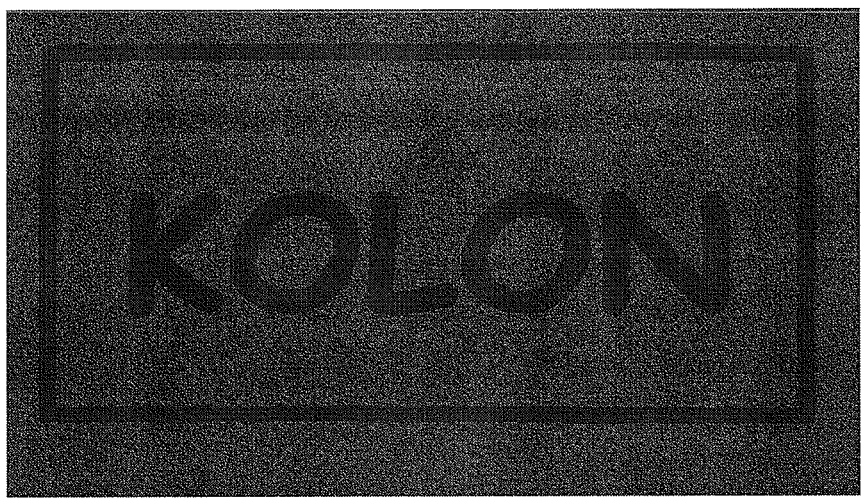
FIG. 3 is a photograph of the polyimide film of Comparative Example 4 having a thickness of 25 μm and placed on a piece of paper.

The polyimide film of each of Example 1 and Comparative Examples 1 and 4, having a thickness of 50 μm, was placed on a piece of paper having yellow letters and lines printed thereon, and photographed. The results are shown in FIGS. 1, 2 and 3.

(4) Color Coordinates

The color coordinates of the polyimide film were measured using a UV spectrophotometer (Cary100, available from Varian) according to ASTM E 1347-06. As such, a standard illuminant was CIE D65.

(5) Glass Transition Temperature (Tg)

The glass transition temperature of the polyimide film was measured using a differential scanning calorimeter (Q200, available from TA Instrument).

TABLE 1

| | | Composition | Molar Ratio | Thick. (μm) | Transmittance 380~780 nm | Transmittance 550 nm | Transmittance 440 nm | Color Coordinates L | Color Coordinates a | Color Coordinates b |
|---|---|---|---|---|---|---|---|---|---|---|
| Ex. | 1 | 6HBDA + BPDA/2,2'-TFDB | 8:2:10 | 50 | 85.9 | 91.18 | 79.93 | 96.0719 | −0.1731 | 0.9608 |
| | 2 | 6HBDA + ODPA/2,2'-TFDB | 7:3:10 | 50 | 85.91 | 89.41 | 85.90 | 95.77 | 0.0934 | 1.1823 |
| | 3 | 6FDA + ODPA/2,2'-TFDB | 8:2:10 | 50 | 88.31 | 90.23 | 88.88 | 96.0719 | −0.2578 | 1.3642 |
| | 4 | 6FDA + ODPA/2,2'-TFDB | 5:5:10 | 50 | 86.54 | 89.18 | 86.32 | 95.6399 | −0.3608 | 1.7596 |
| | 5 | 6FDA + ODPA/2,2'-TFDB | 4:6:10 | 50 | 86.53 | 89.32 | 87.32 | 95.7415 | −0.3301 | 1.4011 |
| | 6 | 6FDA + BPDA/2,2'-TFDB | 8:2:10 | 50 | 86.85 | 89.8 | 87.52 | 96.2176 | −0.2745 | 1.0318 |
| | 7 | 6FDA + BPDA/2,2'-TFDB | 7:3:10 | 50 | 86.6 | 89.63 | 86.58 | 96.0089 | −0.2668 | 1.1654 |
| | 8 | 6FDA + PMDA/2,2'-TFDB | 8:2:10 | 50 | 86.7 | 90.08 | 87.15 | 96.0068 | −0.7892 | 2.1328 |
| | 9 | 6FDA + ODPA/2,2'-TFDB + 4,4'-6F | 1:1:1:1 | 50 | 88.14 | 90.69 | 89.48 | 96.2681 | −0.2248 | 1.0072 |
| | 10 | 6FDA + ODPA/2,2'-TFDB + 4,4'-ODA | 5:5:6:4 | 50 | 87.49 | 89.3 | 82.65 | 95.3387 | −0.3596 | 1.8213 |
| | 11 | 6FDA + BPDA/2,2'-TFDB + 3-DDS | 7:3:7:3 | 50 | 86.91 | 89.58 | 81.66 | 95.9742 | −0.2667 | 1.7732 |
| | 12 | 6FDA + ODPA/2,2'-TFDB | 8:2:10 | 50 | 87.11 | 89.13 | 85.85 | 95.0679 | −0.2978 | 1.4542 |
| | 13 | 6FDA + BPDA/2,2'-TFDB | 8:2:10 | 50 | 85.85 | 88.96 | 85.32 | 95.6176 | −0.2864 | 1.3318 |
| | 14 | 6FDA + PMDA/2,2'-TFDB | 8:2:10 | 50 | 85.77 | 89.24 | 84.65 | 95.3168 | −0.8962 | 2.3638 |
| Ex. | 1 | 6HBDA + BPDA/2,2'-TFDB | 8:2:10 | 100 | 85.21 | 89.67 | 75.13 | 95.91 | 0.106 | 1.4817 |
| | 2 | 6HBDA + ODPA/2,2'-TFDB | 7:3:10 | 100 | 85.48 | 88.97 | 85.26 | 95.34 | 0.0984 | 1.2623 |
| | 3 | 6FDA + ODPA/2,2'-TFDB | 8:2:10 | 100 | 86.75 | 88.78 | 86.5 | 96.0281 | −0.2576 | 1.6256 |
| | 4 | 6FDA + ODPA/2,2'-TFDB | 5:5:10 | 100 | 85.36 | 88.26 | 84.02 | 95.6126 | −0.4147 | 1.9091 |
| | 5 | 6FDA + ODPA/2,2'-TFDB | 4:6:10 | 100 | 85.8 | 88.23 | 86.43 | 95.4742 | −0.3647 | 2.6758 |
| | 6 | 6FDA + BPDA/2,2'-TFDB | 8:2:10 | 100 | 85.55 | 88.77 | 86.80 | 95.9099 | −0.4006 | 1.5431 |
| | 7 | 6FDA + BPDA/2,2'-TFDB | 7:3:10 | 100 | 85.34 | 88.41 | 83.65 | 95.8334 | −0.4605 | 1.6048 |
| | 8 | 6FDA + PMDA/2,2'-TFDB | 8:2:10 | 100 | 85.21 | 88.45 | 84.9 | 95.8764 | −1.452 | 3.5637 |
| | 9 | 6FDA + ODPA/2,2'-TFDB + 4,4'-6F | 1:1:1:1 | 100 | 87.34 | 88.76 | 85.74 | 96.1062 | −0.3104 | 1.1732 |
| | 10 | 6FDA + ODPA/2,2'-TFDB + 4,4'-ODA | 5:5:6:4 | 100 | 85.4 | 88.51 | 78.65 | 95.1203 | −0.4608 | 2.2653 |
| | 11 | 6FDA + BPDA/2,2'-TFDB + 3-DDS | 7:3:7:3 | 100 | 85.47 | 88.34 | 78.64 | 95.014 | −0.3978 | 2.5456 |
| | 12 | 6FDA + ODPA/2,2'-TFDB | 8:2:10 | 100 | 85.91 | 88.32 | 81.58 | 95.0199 | −0.3128 | 1.7642 |
| | 13 | 6FDA + BPDA/2,2'-TFDB | 8:2:10 | 100 | 85.25 | 88.19 | 81.82 | 95.1576 | −0.2954 | 1.5618 |
| | 14 | 6FDA + PMDA/2,2'-TFDB | 8:2:10 | 100 | 85.17 | 88.46 | 79.06 | 95.0768 | −0.9962 | 2.9238 |
| C. Ex. | 1 | 6FDA/4-BDAF | 10:10 | 25 | 82.8 | 87.2 | 63.1 | 93.6 | 0.56 | 12.6 |
| | 2 | 6FDA/APB-133 | 10:10 | 25 | 84.4 | 87.8 | 77.3 | 95.27 | 0.514 | 3.47 |
| | 3 | 6FDA/3,3'-ODA | 10:10 | 25 | 84.9 | 90.0 | 77.1 | 95.64 | 0.10 | 3.12 |
| | 4 | PMDA/4,4'-ODA | 10:10 | 25 | 56.6 | 73.0 | 0.05 | 88.63 | 6.94 | 90.08 |
| C. Ex. | 1 | 6FDA/4-BDAF | 10:10 | 50 | 82.2 | 86.8 | 58.4 | 93.2 | 0.654 | 15.2 |
| | 2 | 6FDA/APB-133 | 10:10 | 50 | 83.8 | 87.2 | 71.2 | 94.6 | 0.586 | 5.09 |
| | 3 | 6FDA/3,3'-ODA | 10:10 | 50 | 84.3 | 89.2 | 71.4 | 94.6 | 0.124 | 5.03 |
| | 4 | PMDA/4,4'-ODA | 10:10 | 50 | 56.0 | 69.2 | — | 78.5 | 7.05 | — |
| C. Ex. | 1 | 6FDA/4-BDAF | 10:10 | 100 | 81.6 | 86.3 | 52.6 | 91.1 | 0.776 | 21.6 |
| | 2 | 6FDA/APB-133 | 10:10 | 100 | 83.1 | 86.7 | 66.5 | 91.8 | 0.728 | 8.2 |
| | 3 | 6FDA/3,3'-ODA | 10:10 | 100 | 83.5 | 88.8 | 65.8 | 91.6 | 0.138 | 8.34 |
| | 4 | PMDA/4,4'-ODA | 10:10 | 100 | — | — | — | — | — | — |

TABLE 2

| | | Composition | Molar Ratio | Thick. (μm) | 50% Cut-Off (nm) | Tg (° C.) | CTE (ppm/° C.) | Yellow. |
|---|---|---|---|---|---|---|---|---|
| Ex. | 1 | 6HBDA + BPDA/2,2'-TFDB | 8:2:10 | 50 | 392 | 272 | 33.0 | 1.35 |
| | 2 | 6HBDA + ODPA/2,2'-TFDB | 7:3:10 | 50 | 394 | 269 | 31.7 | 2.89 |
| | 3 | 6FDA + ODPA/2,2'-TFDB | 8:2:10 | 50 | 385 | — | 30.5 | 1.13 |
| | 4 | 6FDA + ODPA/2,2'-TFDB | 5:5:10 | 50 | 388 | — | 23.57 | 2.64 |
| | 5 | 6FDA + ODPA/2,2'-TFDB | 4:6:10 | 50 | 390 | — | 22.35 | 2.56 |
| | 6 | 6FDA + BPDA/2,2'-TFDB | 8:2:10 | 50 | 393 | — | 21.65 | 2.46 |
| | 7 | 6FDA + BPDA/2,2'-TFDB | 7:3:10 | 50 | 395 | — | 20.15 | 2.21 |
| | 8 | 6FDA + PMDA/2,2'-TFDB | 8:2:10 | 50 | 397 | — | 27.05 | 1.59 |
| | 9 | 6FDA + ODPA/2,2'-TFDB + 4,4'-6F | 1:1:1:1 | 50 | 389 | — | 33.42 | 3.72 |
| | 10 | 6FDA + ODPA/2,2'-TFDB + 4,4'-ODA | 5:5:6:4 | 50 | 392 | — | 30.5 | 1.22 |
| | 11 | 6FDA + BPDA/2,2'-TFDB + 3-DDS | 7:3:7:3 | 50 | 396 | 284 | 32.85 | 3.01 |
| | 12 | 6FDA + ODPA/2,2'-TFDB | 8:2:10 | 50 | 387 | — | 33.3 | 2.95 |
| | 13 | 6FDA + BPDA/2,2'-TFDB | 8:2:10 | 50 | 394 | — | 27.8 | 2.81 |
| | 14 | 6FDA + PMDA/2,2'-TFDB | 8:2:10 | 50 | 398 | — | 30.25 | 2.66 |
| Ex. | 1 | 6HBDA + BPDA/2,2'-TFDB | 8:2:10 | 100 | 394 | 272 | 31.0 | 2.06 |
| | 2 | 6HBDA + ODPA/2,2'-TFDB | 7:3:10 | 100 | 396 | 269 | 30.85 | 3.24 |
| | 3 | 6FDA + ODPA/2,2'-TFDB | 8:2:10 | 100 | 392 | — | 28.9 | 1.72 |
| | 4 | 6FDA + ODPA/2,2'-TFDB | 5:5:10 | 100 | 389 | — | 22.0 | 2.88 |
| | 5 | 6FDA + ODPA/2,2'-TFDB | 4:6:10 | 100 | 391 | — | 21.45 | 2.26 |
| | 6 | 6FDA + BPDA/2,2'-TFDB | 8:2:10 | 100 | 398 | — | 20.45 | 3.97 |
| | 7 | 6FDA + BPDA/2,2'-TFDB | 7:3:10 | 100 | 399 | — | 19.22 | 2.86 |
| | 8 | 6FDA + PMDA/2,2'-TFDB | 8:2:10 | 100 | 399 | — | 25.86 | 2.49 |
| | 9 | 6FDA + ODPA/2,2'-TFDB + 4,4'-6F | 1:1:1:1 | 100 | 392 | — | 30.0 | 4.61 |
| | 10 | 6FDA + ODPA/2,2'-TFDB + 4,4'-ODA | 5:5:6:4 | 100 | 397 | — | 28.36 | 2.11 |
| | 11 | 6FDA + BPDA/2,2'-TFDB + 3-DDS | 7:3:7:3 | 100 | 398 | 284 | 31.94 | 3.67 |
| | 12 | 6FDA + ODPA/2,2'-TFDB | 8:2:10 | 100 | 390 | — | 31.9 | 3.56 |
| | 13 | 6FDA + BPDA/2,2'-TFDB | 8:2:10 | 100 | 396 | — | 27.1 | 4.78 |
| | 14 | 6FDA + PMDA/2,2'-TFDB | 8:2:10 | 100 | 399 | — | 29.46 | 3.34 |
| C. Ex. | 1 | 6FDA/4-BDAF | 10:10 | 25 | 411 | 263 | 52.3 | 9.7 |
| | 2 | 6FDA/APB-133 | 10:10 | 25 | 395 | 206 | 47.1 | 5.5 |
| | 3 | 6FDA/3,3'-ODA | 10:10 | 25 | 396 | 244 | 41.0 | 5.29 |
| | 4 | PMDA/ODA | 10:10 | 25 | 514 | No | 26.0 | 91.7 |
| C. Ex. | 1 | 6FDA/4-BDAF | 10:10 | 50 | 413 | — | 51.1 | 11.2 |
| | 2 | 6FDA/APB-133 | 10:10 | 50 | 398 | — | 46.0 | 6.9 |
| | 3 | 6FDA/3,3'-ODA | 10:10 | 50 | 399 | — | 39.6 | 6.46 |
| | 4 | PMDA/4,4'-ODA | 10:10 | 50 | — | — | 25.0 | — |
| C. Ex. | 1 | 6FDA/4-BDAF | 10:10 | 100 | 415 | — | 48.8 | 23.4 |
| | 2 | 6FDA/APB-133 | 10:10 | 100 | 401 | — | 44.5 | 14.2 |
| | 3 | 6FDA/3,3'-ODA | 10:10 | 100 | 405 | — | 39.1 | 14.26 |
| | 4 | PMDA/4,4'-ODA | 10:10 | 100 | — | — | — | — |

As is apparent from the results of measurement of the properties, the polyimide films of the present invention could be seen to have the CTE of 35.0 ppm/° C. or less and thus be applicable to LCDs.

Further, the polyimide film of the present invention had average transmittance of 85% or more at 380~780 nm, with transmittance of 88% or more at 550 nm and transmittance of 70% or more at 440 nm. Also, the color coordinates thereof had L of 90 or more, a of 5 or less and b of 5 or less, and the 50% cut-off wavelength thereof was measured to be 400 nm or less. The polyimide film of the present invention had a yellowing index superior to that of polyimide films of the comparative examples. As shown in FIG. 1, the polyimide film of the present invention was transparent to the extent that yellow letters and lines printed on paper placed therebeneath could be seen.

However, the polyimide films of the comparative examples had a high CTE. The polyimide film of Comparative Example 1 was yellow-like as seen in FIG. 2, despite the thickness of 25 μm.

Although the polyimide film of Comparative Example 4 had a low CTE, the yellowing index thereof was very high at the level of 91.7. As shown in FIG. 3, this polyimide film was colored to the extent that yellow letters and lines printed on paper placed therebeneath could not be seen, despite a thickness of 25 μm, and thus is considered difficult to apply to the field requiring transparency.

The invention claimed is:

1. A polyimide film, which is manufactured from a copolymer of aromatic dianhydrides and an aromatic diamine, and has an average coefficient of linear thermal expansion of 35.0 ppm/° C. or less, when measured at 50-250° C. for a film thickness of 50-100 μm according to a TMA method, with a yellowing index of 4.78 or less, wherein the polyimide film has color coordinates in which L is 90 or more, a is 5 or less and b is 5 or less, when measured using a UV spectrophotometer for the film thickness of 50-100 μm;

wherein the aromatic dianhydrides comprise (i) one or more selected from the group consisting of 2,2-bis(3,4-dicarboxyphenyl)hexafluoropropane dianhydride, 4-(2,5-dioxotetrahydrofuran-3-yl)-1,2,3,4-tetrahydronaphthalene-1,2-dicarboxylic anhydride, and 4,4'-(4,4'-isopropylidenediphenoxyl)bis(phthalic anhydride), and (ii) one or more selected from the group consisting of pyromellitic dianhydride, biphenyltetracarboxylic dianhydride, and oxydiphthalic dianhydride;

wherein the aromatic diamine comprises (i) 2,2-bis[4-(4-aminophenoxy)-phenyl]propane 2,2'-bis(trifluoromethyl)-4,4'-diaminobiphenyl or 3,3'-bis(trifluoromethyl)-4,4'-diaminobiphenyl and (ii) one or more selected from the group consisting of 4,4'-bis(3-aminophenoxy)diphenylsulfone, bis(3-aminophenyl)sulfone, bis(4-aminophenyl)sulfone, 1,3-bis(3-aminophenoxy)benzene, 1,4-bis(4-aminophenoxy)benzene, 2,2'- bis[3(3-aminophenoxy)phenyl]hexafluoropropane, 2,2'-bis[4(4-aminophenoxy)phenyl]hexafluoropropane, 2,2'-bis(3-aminophenyl)hexafluoropropane, 2,2'-bis(4-aminophenyl)hexafluoropropane and oxydianiline;

wherein a molar ratio of the (i) aromatic dianhydride and the (ii) aromatic dianhydride is 4:6-8:2; and wherein the polyimide film is obtained by polymerizing the aromatic diamine and the aromatic dianhydrides in presence of a first solvent to obtain a polyamic acid solution, imidizing the polyamic acid solution, adding the imidized solution to a second solvent, performing filtration and drying to obtain a solid polyimide resin, dissolving the solid polyimide resin in the first solvent to give a polyimide solution, which is then subjected to a film forming process.

2. The polyimide film according to claim 1, which has an average transmittance of 85% or more at 380-780 nm, when measured using a UV spectrophotometer for the film thickness of 50-100 μm.

3. The polyimide film according to claim 1, which has a transmittance of 88% or more at 550 nm and a transmittance of 70% or more at 440 nm, when measured using a UV spectrophotometer for the film thickness of 50-100 μm.

4. The polyimide film according to claim 1, which has a 50% cut-off wavelength of 400 nm or less, when measured using a UV spectrophotometer.

5. The polyimide film according to claim 1, wherein the second solvent has a polarity lower than that of the first solvent.

6. The polyimide film according to claim 1, wherein the first solvent comprises one or more selected from the group consisting of m-cresol, N-methyl-2-pyrrolidone, dimethylformamide, dimethylacetamide, dimethylsulfoxide, acetone, diethylacetate; a low boiling point solvent; and a low absorbing solvent, and the second solvent comprises one or more selected from the group consisting of water, alcohols, ethers, and ketones.

7. A substrate for a display, comprising the polyimide film of claim 1.

8. An alignment layer, comprising the polyimide film of claim 1.

9. A protective film, comprising the polyimide film of claim 4.

10. The substrate according to claim 7, wherein the polyimide film has an average transmittance of 85% or more at 380-780 nm, when measured using a UV spectrophotometer for the film thickness of 50-100 μm.

11. The substrate according to claim 7, wherein the polyimide film has a transmittance of 88% or more at 550 nm and a transmittance of 70% or more at 440 nm, when measured using a UV spectrophotometer for the film thickness of 50-100 μm.

12. The substrate according to claim 7, wherein the polyimide film has a 50% cut-off wavelength of 400 nm or less, when measured using a UV spectrophotometer.

* * * * *